United States Patent
Barsness et al.

(10) Patent No.: US 7,065,756 B2
(45) Date of Patent: Jun. 20, 2006

(54) OPTIMIZATION OF PORTABLE OPERATIONS IN A CLIENT-SERVER ENVIRONMENT

(75) Inventors: Eric Lawrence Barsness, Pine Island, MN (US); Richard Dean Dettinger, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 10/225,842

(22) Filed: Aug. 22, 2002

(65) Prior Publication Data

US 2004/0040012 A1  Feb. 26, 2004

(51) Int. Cl.
*G06F 9/45* (2006.01)
(52) U.S. Cl. .................. 717/148; 709/205
(58) Field of Classification Search ........ 717/114–116, 717/118, 120–123, 145, 151, 148; 715/500, 715/513, 744, 749; 709/202–203, 310, 314, 709/205, 208
See application file for complete search history.

(56) References Cited

U.S. PATENT DOCUMENTS

| | | | | |
|---|---|---|---|---|
| 6,385,636 B1* | 5/2002 | Suzuki | ................ | 718/105 |
| 6,539,437 B1* | 3/2003 | Windheim et al. | ......... | 719/330 |
| 6,633,898 B1* | 10/2003 | Seguchi et al. | ............ | 709/201 |
| 6,678,715 B1* | 1/2004 | Ando | ................ | 718/105 |
| 6,697,849 B1* | 2/2004 | Carlson | ............. | 709/219 |
| 2002/0130900 A1* | 9/2002 | Davis | ................ | 345/744 |

OTHER PUBLICATIONS

JavaServer Pages Technology, "Powering the Web Experience with Dynamic Content," Chapters 1-6, Sun Microsystems, Inc, Nov. 1999.
http://javascript.internet.com/forms/, "The JavaScript Source: Form Scripts," pp. 1-33, printed May 29, 2002.

* cited by examiner

*Primary Examiner*—Wei Y. Zhen
*Assistant Examiner*—Mary Steelman
(74) *Attorney, Agent, or Firm*—Wood, Herron & Evans, LLP (57) ABSTRACT

An apparatus, program product and method optimize the interaction between a client and server via an active document through the modification of server-side program code that generates the active document to effectively shift the performance of portable operations, e.g., data formatting and data validation operations, from the server to the client.

29 Claims, 3 Drawing Sheets

OPTIMIZATION OF PORTABLE OPERATIONS IN A CLIENT-SERVER ENVIRONMENT

FIELD OF THE INVENTION

The invention relates to computers and computer systems, and in particular, to the handling of active documents in a client-server environment.

BACKGROUND OF THE INVENTION

The Internet has profoundly changed many aspects of contemporary society, and has become an increasingly important resource for numerous educational, entertainment and commercial purposes. Much of the Internet's popularity has been due to the relatively intuitive manner in which textual and graphical information is presented to users, as well as the relatively unstructured and freeform manner in which users are permitted to navigate to other related repositories of information.

A significant portion of the information accessed over the Internet is presented to users in the form of documents, or web pages, which are downloaded from centralized "server" computers to individual client computers upon request and displayed to users by applications known as "web browsers" that execute on the client computers. The manner in which multiple client computers can access information from a server computer is generally referred to as client-server computing, and much of the Internet is based upon this well accepted networking scheme.

The documents downloaded to clients are typically encoded with one or more embedded tags defined in a markup language such as the Hypertext Markup Language (HTML) that control the formatting of the documents when viewed on a web browser. Such documents typically draw extensively on the concept of hypertext linking, whereby documents are linked together by links displayed in the documents and defined by various embedded tags. Through user selection of a link displayed in one document, the user is typically able to have another document that is referenced by the link retrieved and displayed to the user.

Standardized formats such as HTML and the like have been developed for hypertext and other types of documents, and for the various types of information that can be incorporated into such documents, which often permits such documents to be accessed by a wide variety of client computers irrespective of the underlying hardware or software platforms used on those computers. In addition, due to the highly intuitive and flexible interface supported by the Internet, many private networks now incorporate much of the same capabilities and standardized formats. Moreover, by utilizing the same formats to present information from both the Internet and a private network, often the same web browser can be used to display both types of information, thus minimizing the amount of software required to be installed on client computers.

New technologies are continually being developed to expand the functionality available through an Internet-based or similar interface, both from the perspective of client computers and of server computers. More complex display capabilities such as advanced user input controls, animation, audio/video, etc. continue to be incorporated into Internet-based interfaces, resulting in an overall more dynamic and powerful interface for end users.

As an example, scripting is utilized in a number of environments to embed instructions into downloaded documents. The instructions are typically interpreted by a web browser when a document is initially presented to a user and/or in response to particular types of input received from a user. In addition, platform-independent programming languages such as the JAVA programming language have been developed to provide a standardized programming interface through which program code may be downloaded and executed by a client to perform more complex tasks than could otherwise be performed by script instructions, which permits practically any functionality to be incorporated into a client.

In many instances, documents may be provided with various forms of embedded or referenced program code, such as scripts, JAVA applets, etc., which effectively renders these documents "active" from the standpoint that the program code embedded within or referenced by the document itself may be used to implement active functionality on the client. Such active documents, for example, have the capability to pass data back to a server in response to user input, as well as to process data received from a server, e.g., to dynamically modify the display of the document on a client computer.

In addition, from the perspective of a server, technologies such as JAVASCRIPT and JAVA may also be utilized by a server to enhance the overall presentation of information and interaction with a user. For example, one popular technology utilized in many Internet-based interfaces is that JAVA "servlets," which are essentially JAVA applets designed to execute on a server, instead of a client. Servlets may be used to dynamically generate documents such as hypertext documents, as well as to handle input received from users via such documents. Servlets may also be used to access back-end services such as application servers and databases.

Yet another technology capable of being implemented on a server is JAVA Server Page (JSP) technology. JSP's are based upon a type of "active" server page technology, where program code is embedded into an HTML-encoded "template" or form that is used to generate a customized document for download to a client.

Active server pages are typically associated with server-side program code, and are used to both generate documents for download to clients, as well as to handle input received from users via such documents. Moreover, the server-side program code associated with such pages may have functionality to access back-end services such as application servers and databases.

Specifically with regard to JSP's, the HTML-encoded forms utilized in JSP's typically incorporate scripts and/or server-side JAVA program code that are compiled upon initial loading of a JSP to generate one or more JAVA servlets that reside on a server and assist in generating downloadable documents from the JSP from, and handle user input received from users via the downloaded documents.

One advantage to the use of JSP's and other forms of active server pages is that the code development is conceptually separated from the presentation development. As a result, the development of content to be distributed to clients can substantially simplified and accelerated as compared to developments that closely tie together content and control.

The use of servlets, JSP's and the like has substantially simplified and accelerated the development of more powerful, flexible and complex user interfaces. However, given the ever-increasing use of the Internet and computers in general, a significant need has arisen as a result of the increasing workloads experienced by servers that supply content to clients over the Internet and/or other public or private networks. In particular, the number of clients requesting tasks from most servers continues to increase, as does the amount of processing overhead required to process the increasingly complex tasks requested by such clients. The incorporation of technologies such as servlets, JSP's and the like further increases server workload due to the relatively processing-intensive nature of many of the functions supported by such technologies.

Servers, like all computers, only have limited resources, and despite the continual gains being made in terms of both processing power and memory capacity, these resources are often quickly consumed by the increased workloads demanded by clients. As the demand on a server increases, the response times to clients increase, which decreases user productivity and often increases user frustration. However, increasing server capacity often necessitates either replacing a server with a more advanced model, or networking together multiple servers to share the overall burden. In either case, however, the addition of capacity is often an expensive proposition.

Therefore, a significant need continues to exist for a manner of minimizing the processing overhead for servers connected to the Internet or other client-server environments. In particular, a continuing need exists for a manner of decreasing the processing overhead in a server that is associated with generating active documents and handling the interaction with users via such documents.

SUMMARY OF THE INVENTION

The invention addresses these and other problems associated with the prior art by providing an apparatus, program product and method in which interaction between a client and server via an active document is optimized through the modification of server-side program code that generates the active document to effectively shift the performance of certain operations, herein referred to as "portable operations," from the server to the client. By doing so, often the processing overhead of a server in handling active documents can be substantially reduced, thus decreasing server workload and response times, and often increasing server workload capacity.

A portable operation may include practically any operation that is capable of being performed by both a server and a client, and that is suitable for initiation via embedded program code in an active document. As but one example, a portable operation might be a data formatting operation that formats input data received by a server from a client via an active document, e.g., a string-to-integer conversion that converts an input string into an integer value. When performed by a server, the string-to-integer conversion may require substantial computing resources, particularly when the conversion may be required for hundreds or thousands of clients connected to the server at a given time. However, if the burden for performing such a conversion is shifted to the individual clients via program code embedded into active documents downloaded thereto, the processing overhead for the server in handling such conversion is substantially reduced or eliminated.

Consistent with the invention, optimization may be applied to program code of the type configured to generate an active document for transmission to a client, and to interact with the client via the generated active document. Such optimization may include the identification of a portable operation to be performed by a server when executing the program code, and the modification of the program code to embed at least one instruction in the active document to initiate performance of the portable operation by the client when processing the active document.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter optimize the handling of user interactions via active documents distributed to clients in a client-server environment. Such user interactions are optimized via the identification of one or more portable operations performed by a server in connection with an active document, and the modification of the code utilized to generate and/or interact with such active document so as to enable such portable operations to be performed by a client instead. A portable operation in this context is therefore an operation that can be performed by either a client or a server in connection with the generation and/or processing of an active document.

An active document, in turn, is a document that is capable of incorporating embedded program code for either handling a portable operation or initiating the handling of the portable operation by other program code resident on, or otherwise obtainable by, a client, e.g., via a reference or link to the program code embedded in the document. Typically, an active document is encoded with one or more embedded tags defined by a markup language, such as HTML, Extensible Markup Language (XML), etc. An active document is often additionally a hypertext document that includes embedded links to other documents, although active documents may not include any hypertext links in some instances. In the embodiments discussed hereinafter, the active documents generated thereby take the form of HTML-encoded hypertext documents; however, the invention is not limited to these particular types of active documents.

The embodiments discussed hereinafter, for example, focus on portable operations that format and/or validate data passed between a client and a server, and that are capable of being handled by a client. However, one of ordinary skill in the art having the benefit of the instant disclosure will appreciate that a wide variety of other operations performed in connection with the generation and/or interaction with active documents may be identified and optimized consistent with the invention. The invention is therefore not limited to the particular operations described herein.

Figure 1:
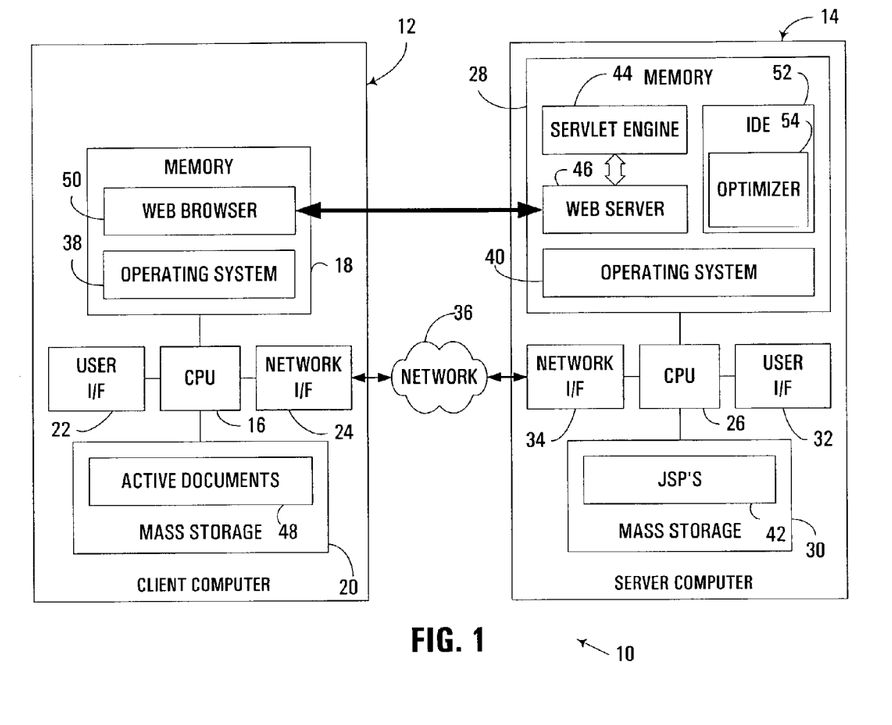
FIG. 1 is a block diagram of a client-server computer system incorporating an optimizer consistent with the invention.

Turning now to the Drawings, wherein like numbers denote like parts throughout the several views, FIG. 1 illustrates a client-server based computer system or environment 10 consistent with the invention. System 10 includes at least one apparatus, e.g., one or more client computers 12 and one or more server computers 14. For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14.

Computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Computer 12 also typically receives a number of inputs and outputs for communicating information externally. For interface with a user or operator, computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, computer 12 may include an interface 24 with one or more networks (e.g., a LAN, a WAN, a wireless network, and/or the Internet, among others) to permit the communication of information with other computers and electronic devices. It should be appreciated that computer 12 typically includes suitable analog and/or digital interfaces between CPU 16 and each of components 18, 20, 22 and 24 as is well known in the art.

In a similar manner to computer 12, computer 14 includes a CPU 26, memory 28, mass storage 30, user interface 32 and network interface 34. However, given the nature of computers 12 and 14 as client and server, in many instances computer 14 will be implemented using a multi-user computer such as a server computer, a midrange computer, a mainframe, etc., while computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each computer 12, 14 operates under the control of an operating system 38, 40, and executes or otherwise relies upon various computer software applications, components, programs, objects, modules, data structures, etc. Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Embodiments consistent with the invention are configured to optimize the interaction between a client and a server via an active document, typically via optimizing the performance of the server through the transference of one or more portable operations from a server to a client. As will be discussed in greater detail below, the transference of a portable operation may be implemented by embedding one or more instructions within the active document to initiate the performance of the portable operation by the client. In this regard, the discussion hereinafter will focus on a particular implementation of the invention in connection with the use of JAVA servlets, and in particular, JAVA servlets associated with JAVA Server Pages (JSP's). As is well known in the art, JSP's may be used to generate active documents through which clients may supply input data for transmission to a server. JSP's are typically compiled at runtime to generate one or more JAVA servlets that execute on a JAVA virtual machine resident on a server computer. Program code in such servlets is then executed to generate appropriate active documents, and to handle any user input received via such active documents.

Figure 2:
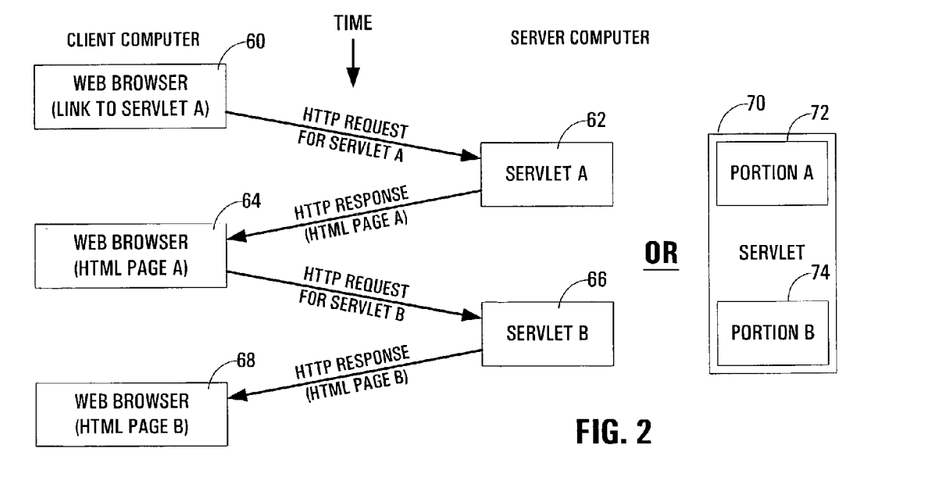
FIG. 2 is a flowchart illustrating the principal steps occurring during client-server interaction in the computer system of FIG. 1.

In some implementations, separate JAVA servlets may generate a particular active document and handle user input received therefrom. For example, as shown in FIG. 2, a typical interaction between a client and a server in computer system 10 is illustrated, starting with the initiation of a servlet A by selection of a link thereto by a web browser executed on the client in block 60. Selection of the link may be, for example, in response to selecting an embedded link in a displayed hypertext document, selecting a bookmark, etc.

Selection of the link results in the generation of a request for servlet A, e.g., via a hypertext transfer protocol (HTTP) request, as is well known in the art. Processing of such a request by the server results in the invocation of servlet A on the server, as shown at block 62. Servlet A is shown generating an active document (HTML page A), and transmitting that document to the client via an HTTP response. The document is then displayed by the web browser (block 64).

Thereafter, a user may supply input data via the active document (HTML page A). Typically, in a JSP environment, such input of data results in the generation of an HTTP request directed to an appropriate servlet resident on the server, here servlet B, as shown at block 66. That input data is processed by servlet B, which typically results in the generation of a second hypertext document (denoted here as HTML page B), which may or may not be active in nature, and which is returned to the client via an HTTP response to the client. The second hypertext document is then displayed by the web browser on the client, as shown at block 68.

In other implementations, different program code within the same servlet may handle both the document generation and interaction functionality. For example, as shown in FIG. 2, rather than two servlets 62, 66, a single servlet 70, including a portion A (block 72) that generates the hypertext document, and a portion B (block 74) that handles user input from the hypertext document, may be used.

In still other implementations, server-side program code other than JAVA servlets may be used to implement either or both of the document generation and interaction operations, e.g., Active Server Pages (ASP's) and other forms of program code. Also, the invention may be implemented in other environments, e.g., in Common Gateway Interface (CGI)-based and other non JAVA environments. Therefore, the invention is not limited to the particular server-side program code implementations discussed herein.

Also in the illustrated embodiments, portable operations are typically implemented within an active document using one or more instructions from a scripting language, e.g., the JAVASCRIPT scripting language. Other scripting languages, as well as other forms of program code, may be used to handle client-side performance of a portable operation. Moreover, the instructions that actually handle a portable operation may be incorporated into a document itself, or in the alternative, only an instruction that initiates the performance of a portable operation by a client need be incorporated into a hypertext document. For example, if program code that performs a portable operation is already resident on a client, or can be downloaded to the client separate from the active document, it may be desirable to incorporate into an active document only those instructions that are necessary to invoke such program code on the client.

In addition, in the illustrated embodiments, the optimization of program code to shift portable operations from a server to a client is performed in connection with compilation of the program code to executable form. As such, the identification of portable operations in program code, and the modification of program code, are typically performed on source code representations of such program code. It will be appreciated, however, that optimization may be performed outside of any compilation process in some embodiments consistent with the invention, or may be applied to program code that is never compiled, e.g., interpretable program code and the like.

It should also be appreciated that transference of a portable operation from a server to a client may involve simply copying program code from a server-side program to a client-side program. However, in many instances, different program code that performs the portable operation in essentially the same operation on the client (and that is often written in a different program language) may be used to replace that which performed the operation on the server.

Now returning briefly to FIG. 1, in the illustrated JSP-based implementation, it is envisioned that one or more JSP's 42, illustrated as resident in server computer 14, are compiled so as to create one or more servlets that are configured for execution by a servlet engine 44 resident on the server to generate one or more active documents for transmission to a client by a web server 46 that is also resident on the server. Such active documents are downloaded to client computers, e.g., as illustrated at block 48 in FIG. 1. Such active documents are processed by a client-side web browser 50, which renders the documents on a client display, and which generates requests to the server that supply input data to the server in response to user input, in a manner well known in the art.

In the illustrated embodiment, JSP's 42 are developed in a integrated development environment (IDE) 52, such as the IBM WebSphere Studio Application Developer environment available from International Business Machines Corporation, which may include a text editor as well as a compiler for creating JSP's. As is also shown in FIG. 1, IDE 52 may also include an optimizer 54, which is utilized to analyze JSP's to identify one or more portable operations that could be implemented client-side via a modification of the JSP or any program code associated therewith.

Figure 3:
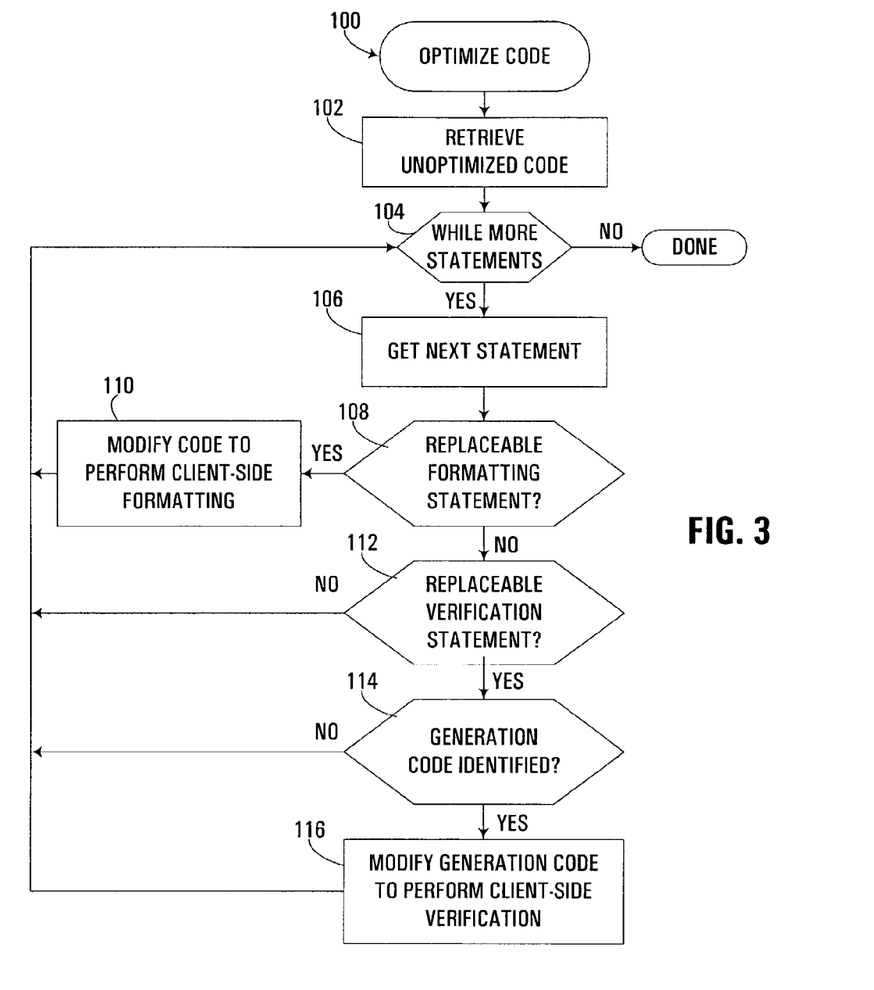
FIG. 3 is a flowchart illustrating the program flow of an optimize code routine executed by the optimizer of FIG. 1.

FIG. 3 illustrates an optimize code routine 100, which may be executed by optimizer 54 to optimize program code in a manner consistent with the invention. Routine 100 may be called, for example, explicitly by a user using IDE 52, or may be invoked in some instances automatically, e.g., in response to an analysis of run-time data, or otherwise independent of any user input. Furthermore, in some instances, routine 100 may be executed in connection with compilation of program code into executable form, or in the alternative, may be applied to executable program code independent of any compilation process.

Routine 100 begins in block 102 by retrieving the appropriate unoptimized code for which it is desired to apply the herein-described optimization. In a JSP environment, the unoptimized code may represent code embedded in a JSP or, in the alternative, JAVA program code that is referenced by or otherwise associated with a JSP.

Next, block 104 initiates a loop to process each statement in the unoptimized code. For each such statement, block 104 passes control to block 106 to retrieve the next statement. Block 108 then determines whether that statement is a replaceable formatting statement, i.e., whether the statement is a formatting-type statement that is suitable for implementation client-side rather than server-side. If so, block 108 passes control to block 110 to modify the code to implement client-side formatting, and to remove any redundant server-side functionality. Control then returns to block 104 to process additional statements.

If the statement is not a replaceable formatting statement, control passes to block 112 to determine whether the statement is a replaceable validation statement, i.e., whether the operation performed by the statement is a validation operation that may be performed client-side rather than server-side. If not, control returns to block 104 to process additional statements. Otherwise, control passes to block 114 to determine whether any generation code has been identified. In this regard, the generation code refers to server-side program code associated with the JSP, and configured to generate an active document using the JSP. For example, in implementations where separate servlets are used to generate an active document, and to handle interaction with the user via the active document, block 114 looks for the preceding servlet that implements the generation of the active document.

In other embodiments where a single servlet is used, block 114 may simply look for program code in the same servlet that handles the generation of the active document. In still other embodiments, certain formatting operations may require modification of the servlet that implements the generation of the active document, whereby such operations would be handled in a similar manner to the validation operations described herein.

If no generation code has been identified, block 114 returns control to block 104 to process additional statements. Otherwise, block 114 passes control to block 116 to modify the generation code (whether in the same or a separate program or servlet) to implement client-side validation. Additionally, any corresponding, but now redundant, validation functionality in the server-side code is removed. Control then returns to block 104 to process additional statements.

Block 104 processes all statements in the code until no more unprocessed statements remain. Once all such statements have been processed, routine 100 is complete.

It will be appreciated that other routines may be utilized to implement the aforementioned optimization consistent with the invention. Therefore, the invention is not limited to the specific routines described herein.

It will be apparent to one of ordinary skill in the art having the benefit of the instant disclosure that a wide variety of portable operations may be optimized for performance on a client in a manner consistent with the invention. For instance, as one example of a formatting-type portable operation, a servlet might incorporate program code such as the following to display a string, with a server side trim( ) operation used to trim leading and trailing blanks from the string prior to display:

```
servletOutputStream.println("Name:'41 +nameStr.t-
    rim( )+'"")
```

To implement the trim( ) operation client-side, a form tag used to generate an active document may be modified to add the following JAVASCRIPT instructions to the active document:

```
while("+this.value.charAt(0)=="")
    this.value=this.value.substring(1,this.value.length);
while("+this.value.charAt(this.value.length-1)=="")
    this.value=this.value.substring(0,this.value.length-1);
```

As one example of a validation-type portable operation, a servlet might incorporate program code such as the following to return an error HTML document if null data is returned for a particular field in an active document:

```
String data=queryStringHT.get("field1");
if(data==null)
    // return error page
```

To implement this error checking client-side, a form tag used to generate an active document may be modified to add an onSubmit="return validate( )" parameter, as well as program code for the following function, which may be additionally updated to include necessary field names:

```
function validate( ) {
    if (document.formName.field1.value=="")
        return false;
    return true;
}
```

A wide variety of alternate formatting and validation operations may be contemplated consistent with the invention. Formatting operations may include, for example, operations that convert user input to a different data format (e.g., string to integer, integer to floating point, string to character, etc.), operations that apply a date format to user input (e.g., to convert "5-5-98" to "May 5, 1998"), operations that truncate one or more characters from user input (e.g., to trim blanks or leading zeros), operations that add commas or decimal points to user input, etc. Validation operations may include, for example, operations that check for null input, for out of range input, for improperly formatted input, etc., as well as operations that perform various remediation, notification or other corrective actions in response to invalid input.

Several JAVASCRIPT functions that might be used to implement various server-side operations on a client, for example, are described in "The JavaScript Source: Form Scripts" [online], INT Media Group, Incorporated, 2002 [retrieved on 2002May 29], retrieved from the Internet: <URL: http://javascript.internet.com/forms/>, which is incorporated by reference herein.

It will be appreciated, however, that practically any operation that is capable of being implemented client-side, but that is initially configured to be implemented server-side, may be transferred to a client in the manner described herein. Therefore, the invention is not limited to the particular portable operations described herein.

Figure 4:
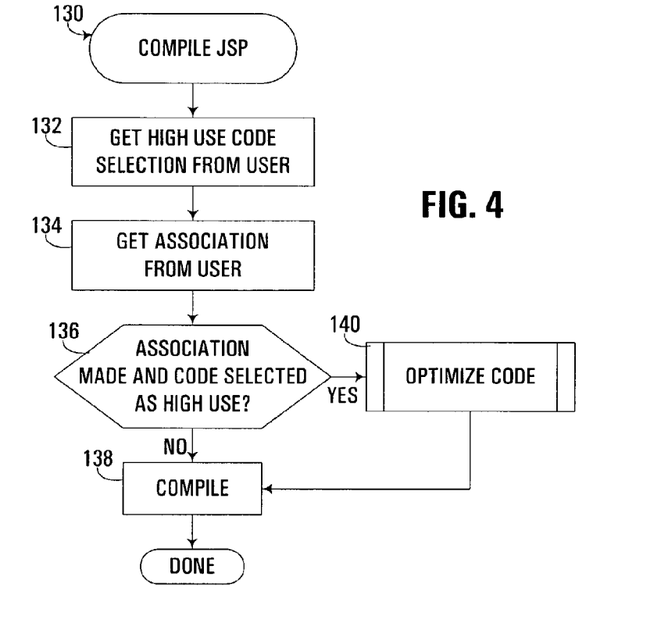
FIG. 4 is a flowchart illustrating the program flow of a compile JSP routine capable of being executed by the Integrated Development Environment (IDE) of FIG. 1.

As mentioned above, implementation of the aforementioned optimization functionality may be performed in a number of contexts. For example, as illustrated in FIG. 4, optimization may be implemented in connection with the compilation of a JSP, e.g., via a routine such as routine 130. In connection with such compilation, and as shown at block 132, in some instances a user may be requested to select high-use code, e.g., by selecting whether or not optimization should be performed for a particular JSP being compiled. For example, where it is determined that a particular JSP will not be particularly computationally intensive, or may not be accessed relatively frequently, it may be desirable to disable optimization during compilation of such JSP. In other environments, however, a user may not be requested to designate a JSP as containing high-use code, whereby block 132 may be omitted.

In addition, during the compilation process, a user may be requested to provide any associations between a JSP and its related program code, as shown in block 134. In a graphical environment such as an IDE the user could associate a JSP file with one or more JAVA classes that handle the generation and/or interaction functionalities of the JSP. Once the relationship is established, the optimizer would be aware of the operations that are performed in connection with the JSP, and thus would be capable of identifying those operations that are portable in nature. In addition, having this information, it would be relatively straightforward to modify the JSP file to incorporate instructions such as JAVASCRIPT instructions into the HTML code utilized to generate the active document produced by the JSP file.

When two cooperating servlets are used to handle generation and interaction, the IDE association concept could be additionally used such that the developer could designate a "flow" from one servlet to another, whereby the optimizer would be able shift operations such as formatting and/or parameter checking performed by the second servlet to JAVASCRIPT operations in the active document generated by the first servlet, thus decreasing the overhead in the second servlet. Moreover, in some instances where parameter checking is shifted from the server to the client, invalid requests could effectively be prevented from even reaching the server, and furthermore accelerating the execution of any valid requests by the second servlet due to the omission of validation code therefrom.

In the case where a single servlet is used to handle both generation and interaction, since all the HTML generation and interaction processing are done in the same servlet, moving operations between these sections would be relatively straightforward. In still other implementations, e.g., where a servlet interacts with a static HTML file, the static HTML file could be modified to incorporate active processing via scripts and the like to implement portable operations as described herein.

Returning to FIG. 4, once the association has been received from a user, control passes to block 136 to determine whether the association was made and the code was selected is high-use. If not, control passes to block 138 to compile the JSP in a manner known in the art. Otherwise, control passes to block 140 to optimize the code, prior to compiling the JSP in block 138. The optimize code routine 140 may take a number of forms, including that of routine 100 of FIG. 3.

Once the JSP has been compiled, the JSP will be configured to generative active documents incorporating one or more portable operations initially slated by execution for the server. As such, the performance overhead associated with the portable operation is effectively eliminated from the server.

Figure 5:
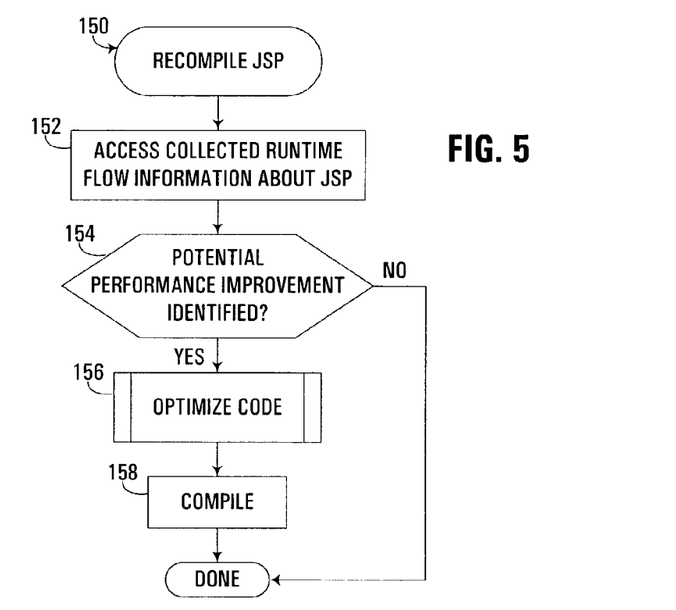
FIG. 5 is a flowchart illustrating the program flow of a recompile JSP routine capable of being executed by the Integrated Development Environment (IDE) of FIG. 1.

In still other embodiments, the initiation of an optimization process may be performed in response to run-time analysis of a JSP or its associated code. For example, as shown in FIG. 5, a recompile JSP routine 150 may access collected run-time flow information about a particular JSP in block 152, it being understood that the process of collecting run-time flow information about program code in a computer is generally well known in the art. Such information could be collected at runtime and subsequently be fed back into the IDE to initiate a recompile, similar to the process of Feedback Directed Program Restructuring (FDPR) or other similar processes known in the art.

Based upon such information, block 154 may determine whether a potential performance improvement has been identified, e.g., in a similar manner to that described above in connection with FIG. 3. If no such improvement has been identified, routine 150 may terminate. Otherwise, control may pass to block 156 to optimize the code in the same manner as described above, and then to block 158 to compile the JSP with the optimized code.

As mentioned above, however, the optimization of program code associated with an active document may be initiated in a number of other manners. Therefore, the invention is not limited to the particular implementations discussed herein.

By off-loading work from a server to one or more clients, server performance may be improved in a number of ways. For example, the processing overhead associated with performing a particular portable operation may be off-loaded from the server to a client.

Moreover, for some portable operations, the amount of data transmitted to the server from the client, or vice versa, may be reduced, thus improving network communications. For example, where a trim operation is performed to eliminate blank spaces from a string, the blank spaces that are removed from the string are no longer communicated from the client to the server, thus reducing the volume of information transmitted.

In other instances, e.g., in connection with validation operations, server performance and network traffic may also be improved by the elimination of certain requests that otherwise would require the transmission of additional requests from a client to a server. For example, where a user inputs invalid data, and validation is performed by a server, a first request submitting such invalid data would be retrieved by the server and declared invalid, necessitating that the client issue a new request with valid data. Where the validation is handled by the client, the invalid request would never be issued in the first place.

Various modifications may be made to the illustrated embodiments without departing from the spirit and scope of the invention. For example, the embodiments described above focus on portable operations conducted in connection with the handling of input data received via an active document. In other embodiments, a portable operation may be performed in connection with the handling of output data sent by a server to a client, e.g., to format information sent by a server to a client prior to its display on the client. In addition, a portable operation may be performed in connection with the display of a hypertext document, e.g., to shift some of the burden of rendering a document in a particular format from the server to the client.

Other modifications will be apparent to one of ordinary skill in the art having the benefit of the instant disclosure. Therefore, the invention lies in the claims hereinafter appended.

What is claimed is:

1. A method of compiling a JAVA Server Page (JSP) resident on a server, the method comprising:
    (a) receiving first server program code associated with a JSP that is configured to generate an active document for transmission to a client, wherein the active document is configured to initiate the transmission of input data from the client to the server in response to user input supplied to the active document;
    (b) receiving second server program code associated with the JSP that is configured to process the input data received by the server from the client;
    (c) identifying a portable operation performed by the second server program code in connection with processing the input data, wherein the portable operation includes at least one of formatting the input data and validating the input data;
    (d) modifying the first server program code to generate the active document with at least one instruction embedded therein to initiate performance of the portable operation by the client when processing the active document;
    (e) modifying the second server program code to eliminate performance of the portable operation by the second server program code; and
    (f) compiling the modified first and second server program code to generate at least one JAVA servlet for execution on the server.

2. A method of optimizing program code of the type configured to generate an active document for transmission to a client, and to interact with the client via the generated active document, the method comprising:
    (a) identifying a portable operation to be performed by a server when executing the program code; and
    (b) modifying the program code in response to identifying the portable operation to embed at least one instruction in the active document to initiate performance of the portable operation by the client when processing the active document.

3. The method of claim 2, further comprising modifying the program code to eliminate performance of the portable operation by the program code.

4. The method of claim 3, wherein modifying the program code to embed at least one instruction in the active document comprises modifying the program code to embed at least one JAVASCRIPT instruction in the active document.

5. The method of claim 2, wherein identifying the portable operation and modifying the program code are performed on a source code representation of the program code, and wherein the method further comprises compiling the modified source code representation of the program code into an executable representation thereof.

6. The method of claim 5, wherein the source code representation of the program code is associated with a JAVA Server Page.

7. The method of claim 5, wherein the executable representation of the program code comprises a JAVA servlet.

8. The method of claim 7, wherein the JAVA servlet includes a first portion configured to generate the active document, and a second portion configured to process user input received from the client via the active document.

9. The method of claim 7, wherein the JAVA servlet is a first JAVA servlet configured to generate the active document, and wherein the executable representation of the program code further comprises a second JAVA servlet configured to process user input received from the client via the active document.

10. The method of claim 2, wherein the portable operation comprises formatting user input received via the active document.

11. The method of claim 10, wherein the portable operation is selected from the group consisting of converting the user input to a different data format, applying a date format to the user input, truncating a character from the user input, adding a comma to the user input, adding a decimal point to the user input, and combinations thereof.

12. The method of claim 2, wherein the portable operation comprises validating user input received via the active document.

13. The method of claim 2, further comprising:
    (a) collecting runtime flow information for the program code; and
    (b) recompiling the program code based upon the collected runtime flow information, wherein identifying the portable operation and modifying the program code are performed in connection with recompiling the program code.

14. The method of claim 2, wherein the active document comprises an HTML-encoded document.

15. An apparatus, comprising:
    (a) a memory; and
    (b) a processor, the processor configured to optimize program code of the type that generates an active document for transmission to a client, and that interacts with the client via the generated active document, wherein the processor is configured to optimize the program code by identifying a portable operation to be performed by a server when executing the program code, and modifying the program code in response to identifying the portable operation to embed at least one instruction in the active document to initiate performance of the portable operation by the client when processing the active document.

16. The apparatus of claim 15, wherein the processor is further configured to modify the program code to eliminate performance of the portable operation by the program code.

17. The apparatus of claim 16, wherein the processor is configured to modify the program code to embed at least one instruction in the active document by modifying the program code to embed at least one JAVASCRIPT instruction in the active document.

18. The apparatus of claim 15, wherein the processor is configured to identify the portable operation and modify the program code using a source code representation of the program code, and wherein the processor is further configured compile the modified source code representation of the program code into an executable representation thereof.

19. The apparatus of claim 18, wherein the source code representation of the program code is associated with a JAVA Server Page.

20. The apparatus of claim 18, wherein the executable representation of the program code comprises a JAVA servlet.

21. The apparatus of claim 20, wherein the JAVA servlet includes a first portion configured to generate the active document, and a second portion configured to process user input received from the client via the active document.

22. The apparatus of claim 20, wherein the JAVA servlet is a first JAVA servlet configured to generate the active document, and wherein the executable representation of the program code further comprises a second JAVA servlet configured to process user input received from the client via the active document.

23. The apparatus of claim 15, wherein the portable operation comprises formatting user input received via the active document.

24. The apparatus of claim 23, wherein the portable operation is selected from the group consisting of converting the user input to a different data format, applying a date format to the user input, truncating a character from the user input, adding a comma to the user input, adding a decimal point to the user input, and combinations thereof.

25. The apparatus of claim 15, wherein the portable operation comprises validating user input received via the active document.

26. The apparatus of claim 15, wherein the processor is further configured to collect runtime flow information for the program code and recompile the program code based upon the collected runtime flow information, and wherein the processor is configured to identify the portable operation and modify the program code in connection with recompiling the program code.

27. The apparatus of claim 15, wherein the active document comprises an HTML-encoded document.

28. A program product, comprising:
(a) first program code configured to optimize second program code of the type that generates an active document for transmission to a client, and that interacts with the client via the generated active document, by identifying a portable operation to be performed by a server when executing the second program code, and modifying the second program code in response to identifying the portable operation to embed at least one instruction in the active document to initiate performance of the portable operation by the client when processing the active document; and
(b) a tangible signal bearing medium bearing the first program code.

29. An apparatus, comprising:
(a) a client configured to receive an active document; and
(b) a server coupled to the client and configured to optimize program code of the type that generates the active document for transmission to the client, and that interacts with the client via the active document, wherein the server is configured to optimize the program code by identifying a portable operation to be performed by the server when executing the program code, and modifying the program code in response to identifying the portable operation to embed at least one instruction in the active document to initiate performance of the portable operation by the client when processing the active document.

* * * * *